United States Patent
Park et al.

(10) Patent No.: US 9,853,291 B2
(45) Date of Patent: Dec. 26, 2017

(54) NEGATIVE ELECTRODE FOR RECHARGEABLE LITHIUM BATTERY, METHOD OF PREPARING SAME AND RECHARGEABLE LITHIUM BATTERY INCLUDING SAME

(75) Inventors: Se-Ho Park, Yongin-si (KR); Bong-Chull Kim, Yongin-si (KR); Dong-Yung Kim, Yongin-si (KR); Cheol-Hee Hwang, Yongin-si (KR); Hyun-Jun Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1195 days.

(21) Appl. No.: 13/326,407

(22) Filed: Dec. 15, 2011

(65) Prior Publication Data

US 2012/0244428 A1  Sep. 27, 2012

(30) Foreign Application Priority Data

Mar. 24, 2011  (KR) .................. 10-2011-0026575

(51) Int. Cl.
*H01M 4/62*  (2006.01)
*H01M 4/38*  (2006.01)
(Continued)

(52) U.S. Cl.
CPC ............ *H01M 4/621* (2013.01); *H01M 4/04* (2013.01); *H01M 4/0471* (2013.01); *H01M 4/13* (2013.01);
(Continued)

(58) Field of Classification Search
None
See application file for complete search history.

(56) References Cited

U.S. PATENT DOCUMENTS 4,332,870 A * 6/1982 Parsen .................... H01M 4/12
429/206
4,391,939 A * 7/1983 Hungerford .................. 524/377
(Continued)

FOREIGN PATENT DOCUMENTS

KR  10-2007-0059717  6/2007
KR  10-2010-0014524  2/2010
(Continued)

OTHER PUBLICATIONS

Sandner et al., "Solid polymer electrolytes based on oligo(ethylene glycol)methacrylates", Polymer Bulletin 28, 355-360 (1992); 6 pages total.*

(Continued)

*Primary Examiner* — Ula C Ruddock
*Assistant Examiner* — Anna Korovina
(74) *Attorney, Agent, or Firm* — Robert E. Bushnell, Esq.

(57) ABSTRACT

A negative electrode for a rechargeable lithium battery, including a negative active material layer including a polymer binder including a repeating unit represented by the following Chemical Formula 1 or the following Chemical Formula 2 and a Si-based negative active material; and a current collector supporting the negative active material layer, is provided:

[Chemical Formula 1]

(Continued)

-continued

[Chemical Formula 2]

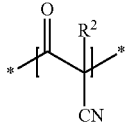

wherein in Chemical Formulae 1 and 2, $R^1$ and $R^2$ are the same or different and hydrogen, OH or OOH.

12 Claims, 7 Drawing Sheets

(51) Int. Cl.
| | |
|---|---|
| H01M 4/36 | (2006.01) |
| H01M 4/134 | (2010.01) |
| H01M 4/04 | (2006.01) |
| H01M 4/13 | (2010.01) |
| H01M 4/02 | (2006.01) |
| H01M 4/48 | (2010.01) |
| H01M 4/587 | (2010.01) |

(52) U.S. Cl.
CPC ........... *H01M 4/134* (2013.01); *H01M 4/362* (2013.01); *H01M 4/62* (2013.01); *H01M 4/622* (2013.01); *H01M 4/366* (2013.01); *H01M 4/386* (2013.01); *H01M 4/483* (2013.01); *H01M 4/587* (2013.01); *H01M 2004/027* (2013.01)

(56) References Cited

U.S. PATENT DOCUMENTS

| | | | |
|---|---|---|---|
| 5,756,231 A * | 5/1998 | Andrei et al. | 429/218.1 |
| 2004/0076886 A1* | 4/2004 | Mori | H01B 1/122 429/306 |
| 2004/0126665 A1* | 7/2004 | Sun | H01M 10/052 429/303 |
| 2004/0224233 A1* | 11/2004 | Chen | H01M 4/60 429/303 |
| 2005/0003285 A1* | 1/2005 | Hayashi et al. | 430/56 |
| 2005/0053840 A1* | 3/2005 | Jo | H01M 2/162 429/247 |
| 2006/0088759 A1* | 4/2006 | Roh | 429/128 |
| 2007/0077490 A1* | 4/2007 | Kim et al. | 429/218.1 |
| 2007/0111102 A1* | 5/2007 | Inoue et al. | 429/232 |
| 2009/0297945 A1* | 12/2009 | Hwang et al. | 429/207 |
| 2010/0129704 A1* | 5/2010 | Luo | H01M 4/0404 429/163 |
| 2010/0323242 A1* | 12/2010 | Choi | H01M 4/13 429/217 |
| 2011/0024939 A1* | 2/2011 | Alves | 264/141 |

FOREIGN PATENT DOCUMENTS

| | | | |
|---|---|---|---|
| KR | 100981909 B | 9/2010 | |
| KR | 1020100104020 | 9/2010 | |
| WO | WO 2007136164 A1 * | 11/2007 | |
| WO | WO 2010083041 A1 * | 7/2010 | A61K 9/5192 |

OTHER PUBLICATIONS

Korean Office Action dated Aug. 27, 2012 in connection with Korean Patent Application Serial No. 10-2011-0026575 and Request for Entry of the Accompanying Office Action attached herewith.

\* cited by examiner

NEGATIVE ELECTRODE FOR RECHARGEABLE LITHIUM BATTERY, METHOD OF PREPARING SAME AND RECHARGEABLE LITHIUM BATTERY INCLUDING SAME

CLAIM OF PRIORITY

This application claims priority to and the benefit of Korean Patent Application No. 10-2011-0026575 filed in the Korean Intellectual Property Office on Mar. 24, 2011, the entire contents of which are incorporated herein by reference.

BACKGROUND OF THE INVENTION

1. Field

The present invention relates to a negative electrode for a rechargeable lithium battery, a method of manufacturing the same, and a rechargeable lithium battery including the same.

2. Description of the Related Art

Lithium rechargeable batteries have recently drawn attention as a power source of small portable electronic devices. They use an organic electrolyte solution and thereby have twice or more the discharge voltage of a conventional battery using an alkali aqueous solution, and accordingly have high energy density.

For positive active materials of a rechargeable lithium battery, lithium-transition element composite oxides being capable of intercalating lithium such as $LiCoO_2$, $LiMn_2O_4$, $LiNi_{1-x}Co_xO_2$ ($0<x<1$), and so on have been researched.

As for negative active materials of a rechargeable lithium battery, various carbon-based materials such as artificial graphite, natural graphite, and hard carbon, which can all intercalate and deintercalate lithium ions, have been used. However, recently there has been research into non-carbon-based negative active materials such as Si in accordance with need for stability and high-capacity.

SUMMARY OF THE INVENTION

One embodiment of the present invention provides a negative electrode for a rechargeable lithium battery having improved cycle life and having no problem of volume expansion.

Another embodiment of the present invention provides a method of manufacturing a negative electrode for a rechargeable lithium battery.

Yet another embodiment of the present invention provides a rechargeable lithium battery including the negative electrode.

According to one embodiment of the present invention, a negative electrode for a rechargeable lithium battery is provided that includes a negative active material layer including a polymer binder including a repeating unit represented by the following Chemical Formula 1 or the following Chemical Formula 2, and a Si-based negative active material; and a current collector supporting the negative active material layer.

[Chemical Formula 1]

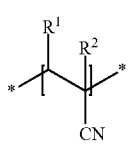

[Chemical Formula 2]

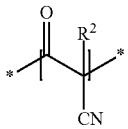

In Chemical Formulae 1 and 2, $R^1$ and $R^2$ are the same or different and hydrogen, OH, or OOH.

The Si-based negative active material may include $SiO_x$ ($0<x<2$), Si, a composite of Si and C, an alloy of Si and Q (wherein, Q is an element selected from the group consisting of an alkali metal, an alkali-earth metal, a Group 13 element, a Group 14 element, a Group 15 element, a Group 16 element, transition elements, a rare earth element, and a combination thereof, not Si), or a combination thereof. The Si-based negative active material may be a composite of Si and C.

In one embodiment of the present invention, the composite of Si and C may include a crystalline carbon core including pores therein, an amorphous carbon shell formed on the surface of the core, and Si nano particles dispersed in the pore and amorphous carbon present inside the pore.

The binder may be included in an amount of 1 wt % to 10 wt % based on the total weight of the negative active material layer.

The polymer binder may be a copolymer of the repeating unit represented by Chemical Formula 1 and methylvinyl triethylene glycol.

The polymer binder may have a weight average molecular weight of 10,000 to 1,000,000.

The negative active material layer may further include a carbon-based negative active material, and the carbon-based negative active material may be included in an amount of 1 part by weight to 95 parts by weight based on 100 parts by weight of the Si-based negative active material.

According to another embodiment of the present invention, the negative electrode is manufactured by the method that includes mixing the Si-based negative active material and the binder in a solvent to prepare a negative active material composition, applying the negative active material composition on a current collector, heat-treating the current collector applied with the negative active material composition at 80° C. to 160° C. The heat-treating may be performed under a vacuum atmosphere.

According to yet another embodiment of the present invention, a rechargeable lithium battery including a negative electrode, a positive electrode including a positive active material and an electrolyte is provided.

Hereinafter, further embodiments of the present invention will be described in detail.

The negative electrode for a rechargeable lithium battery according to the present invention has excellent cycle life and initial charge and discharge efficiency.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Exemplary embodiments of the present invention will hereinafter be described in detail. However, these embodiments are only exemplary, and the present invention is not limited thereto.

According to one embodiment of the present invention, a negative electrode for a rechargeable lithium battery, which includes a negative active material layer including a polymer binder including a repeating unit represented by the following Chemical Formula 1 or 2 and a Si-based negative active material; and a current collector supporting the negative active material layer is provided.

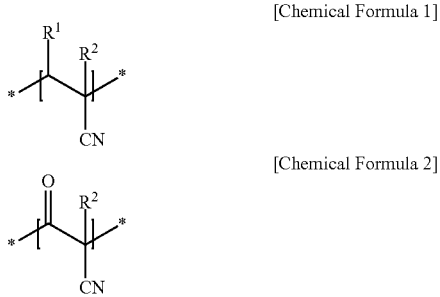

[Chemical Formula 1]

[Chemical Formula 2]

In Chemical Formulae 1 and 2, $R^1$ and $R^2$ are the same or different and hydrogen, OH or OOH.

In one embodiment of the present invention, the Si-based negative active material may include $SiO_x$ ($0<x<2$), Si, a composite of Si and C, an alloy of Si and Q (wherein, Q is an element selected from the group consisting of an alkali metal, an alkali-earth metal, a Group 13 element, a Group 14 element, a Group 15 element, a Group 16 element, a transition element, a rare earth element, and a combination thereof, and not Si), or a combination thereof. For example, the Si-based negative active material may be a composite of Si and C.

Figure 1:
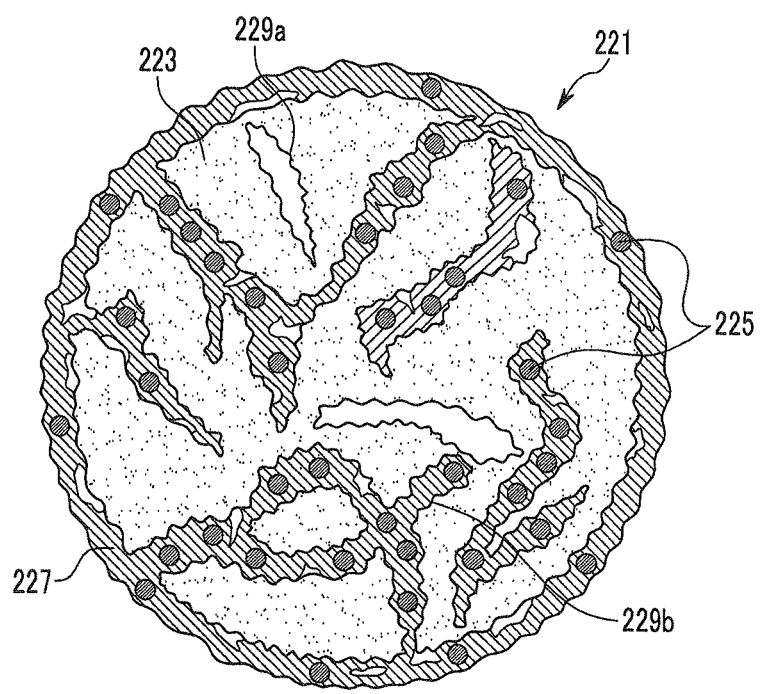
FIG. 1 is a schematic view showing the structure of a composite of Si and C of the negative active material according to one embodiment of the present invention.

In one embodiment of the present invention, the composite of Si and C may include a crystalline carbon core including pores therein; an amorphous carbon shell formed on the surface of the core; and Si nano particles dispersed in the pore and amorphous carbon present inside the pore. The structure of the composite of Si and C is schematically shown in FIG. 1 but is not limited thereto. As shown in FIG. 1, a composite of Si and C 221 includes a crystalline carbon core 223 internally including a pore and an amorphous carbon shell 227. The pore includes a closed-pore 229a formed inside the core and not connected to the shell 227 and an open-pore 229b connected to the shell 227 and extended internally toward the core. In addition, metal nano particles 225 may be dispersed inside the open-pore 229b, and amorphous carbon may exist in both open- and closed-pores 229b and 229a.

The pore may have a pipe or plate shape and form a network inside the core. A negative active material may have porosity ranging from 30 to 50 volume % based on the entire volume thereof. When the negative active material has porosity within the range, the expansion of the negative active material may be internally absorbed in the pores.

In one embodiment of the present invention, the binder may be included in an amount of 1 wt % to 10 wt % based on the total weight of the negative active material layer. When the binder is included out of the range, cycle life is remarkably improved and expansion of a negative electrode during the charge and discharge may effectively be suppressed.

The polymer binder may be a copolymer binder of the repeating unit represented by Chemical Formula 1 and methylvinyl triethylene glycol.

The polymer binder may have a weight average molecular weight of 10,000 to 1,000,000. When the polymer binder has a weight average molecular weight within the range, an electrode may be fabricated to have appropriate adherence but no excessive stiffness.

The negative active material layer may further include a carbon-based negative active material, and the carbon-based negative active material may be included in an amount of 1 part by weight to 95 parts by weight based on 100 parts by weight of the Si-based negative active material.

Examples of the carbon-based material include crystalline carbon, amorphous carbon and a mixture thereof. The crystalline carbon may include at least one of shapeless graphite, sheet-type graphite, flake-type graphite, spherical-shaped graphite or fiber-shaped natural graphite, artificial graphite and a mixture thereof. The amorphous carbon may include at least one of soft carbon or hard carbon, a mesophase pitch carbonized product, fired cokes or a mixture thereof.

The negative active material layer may further include a conductive material. The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber made of copper, nickel, aluminum, silver, and the like; a conductive polymer such as a polyphenylene derivative; or a mixture thereof.

The current collector may be selected from the group consisting of a copper foil, a nickel foil, a stainless steel foil, a titanium foil, a nickel foam, a copper foam, a polymer substrate coated with a conductive metal, and combinations thereof.

The negative electrode according to one embodiment is manufactured by the process that includes mixing the Si-based negative active material and the binder in a solvent to prepare a negative active material composition, applying the negative active material composition on a current collector, heat-treating the current collector applied with the negative active material composition.

The heat treatment may be performed at a temperature ranging from 80° C. to 160° C. or in another embodiment, from 100° C. to 140° C. Herein, the heat treatment may be performed under vacuum atmosphere. The vacuum atmosphere may have vacuum degrees ranging from 0 to 20 mbar. In addition, the heat treatment may be performed ranging from 2 to 10 hours. When the heat treatment is performed within the time range, an organic solvent may be substantially completely removed from an electrode while maintaining the soft state (no brittle) of the binder and an electrode.

As a result, initial charge and discharge efficiency and cycle life may be improved.

In preparing the negative active material composition, a carbon-based negative active material may be further added and/or a conductive material may be further added.

The Si-based negative active material and the binder may be mixed at a ratio ranging from 99:1 to 90:10 wt %. In addition, when a carbon-based negative active material and/or a conductive material is further included, the binder may be included in an amount ranging from 1 wt % to 10 wt % based on the total weight of the solid component of a negative active material composition.

According to another embodiment of the present invention, a rechargeable lithium battery may include a negative electrode according to one embodiment of the present invention, a positive electrode including a positive active material, and a non-aqueous electrolyte.

The positive electrode includes a current collector and a positive active material layer disposed on the current collector. The positive active material includes lithiated intercalation compounds that reversibly intercalate and deintercalate lithium ions. In particular, the following compounds may be used:

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$).

In the above formulas, A is selected from the group consisting of Ni, Co, Mn, and combinations thereof; X is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn and combinations thereof; T is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; Z is selected from the group consisting of Cr, V, Fe, Sc, Y, and combinations thereof; and J is selected from the group consisting of V, Cr, Mn, Co, Ni, Cu, and combinations thereof.

The above compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, and the like, but is not illustrated in more detail, since it is well-known to those who work in the related field.

The positive active material layer may include the positive active material in an amount ranging from 90 wt % to 98 wt % based on the total weight thereof.

The positive active material layer may also include a binder and a conductive material. Herein, the binder and the conductive material may be respectively included in an amount of 1 wt % to 5 wt % based on the total weight of the positive active material layer.

The binder improves binding properties of the positive active material particles to one another, and also with a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material such as metal powder, metal fiber, or the like such as copper, nickel, aluminum, silver, and the like; a conductive polymer such as polyphenylene derivative and the like; or a mixture thereof.

The current collector may be an Al foil but is not limited thereto.

The positive electrodes may be fabricated by a method including mixing a positive active material, a conductive material, and a binder into an active material composition and coating the composition on a current collector. The positive electrode manufacturing method is well known, and thus is not described in detail in the present specification. The solvent may be N-methylpyrrolidone but it is not limited thereto.

In a rechargeable lithium battery according to one embodiment, a non-aqueous electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon group including a double bond, an aromatic ring, or an ether bond), amides such as dimethylformamide, dioxolanes such as 1,3-dioxolane, sulfolanes, and so on.

The non-aqueous organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and the linear carbonate are mixed together in the volume ratio of 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents may be mixed together in the volume ratio of 1:1 to 30:1.

The aromatic hydrocarbon-based organic solvent may be represented by the following Chemical Formula 3.

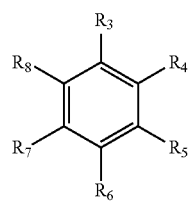

[Chemical Formula 3]

In Chemical Formula 3, $R_3$ to $R_8$ are the same or different, and are independently selected from the group consisting of hydrogen, a halogen, a C1 to C10 alkyl group, a C1 to C10 haloalky group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of the following Chemical Formula 4.

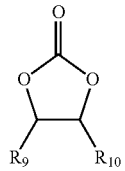

[Chemical Formula 4]

In Chemical Formula 4, $R_9$ and $R_{10}$ are the same or different and independently selected from the group consisting of hydrogen, a halogen, a cyano group (CN), a nitro group ($NO_2$), and a C1-C5 fluoroalkyl group, provided that at least one of $R_9$ and $R_{10}$ is a halogen, a cyano group (CN), a nitro group ($NO_2$), or a C1-C5 fluoroalkyl group, and $R_9$ and $R_{10}$ are not simultaneously hydrogen.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, operates a basic operation of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiC4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bisoxalate borate; LiBOB). The lithium salt may be used at a 0.1 to 2.0M concentration. When the lithium salt is included at the above concentration range, electrolyte performance and lithium ion mobility may be enhanced due to optimal electrolyte conductivity and viscosity.

The rechargeable lithium battery may further include a separator between a negative electrode and a positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
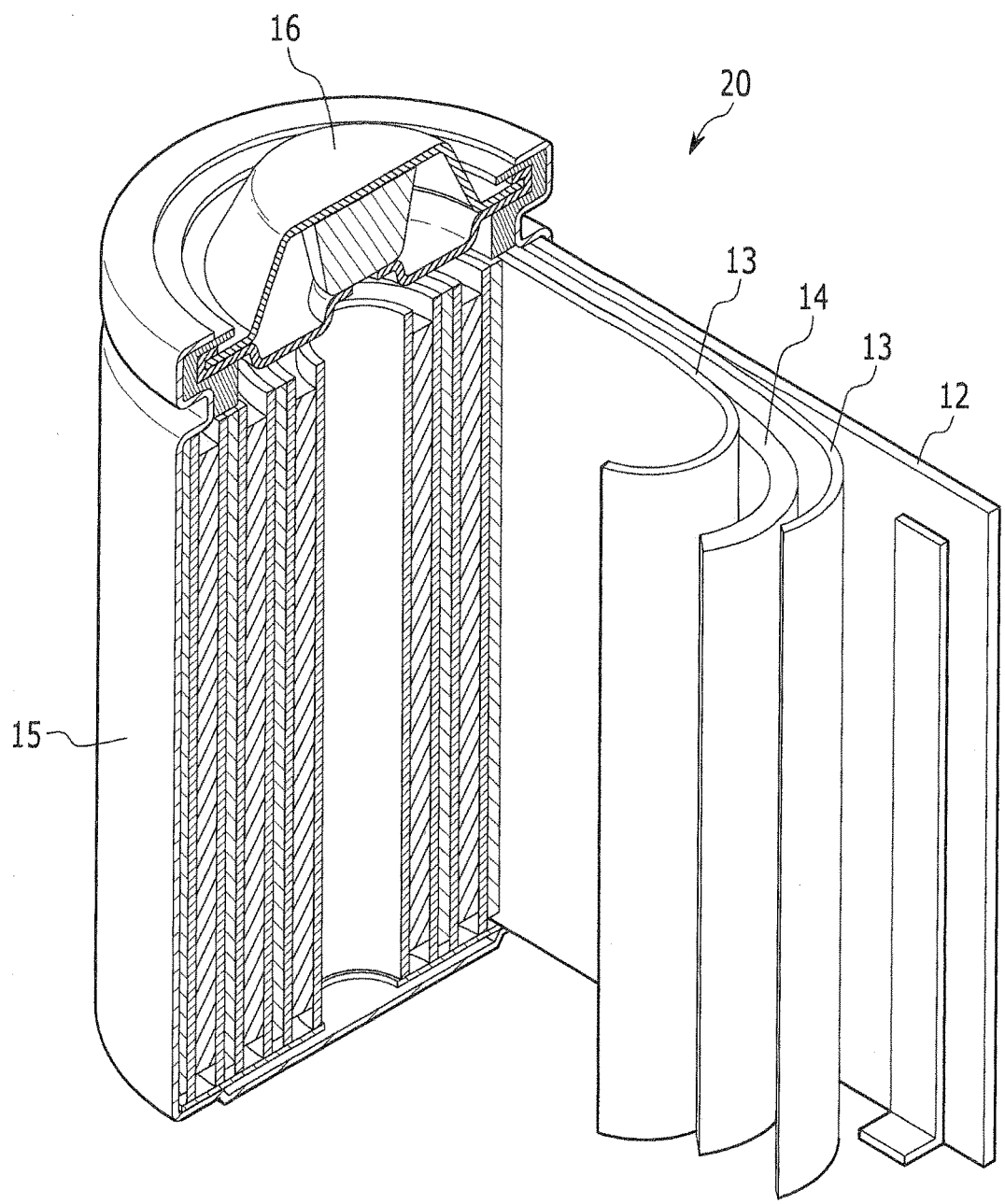
FIG. 2 is a schematic view showing the structure of a rechargeable lithium battery according to one embodiment of the present invention.

FIG. 2 is a schematic view of a representative structure of a rechargeable lithium battery. FIG. 2 illustrates a rechargeable lithium battery 20, which includes a positive electrode 14, a negative electrode 12, a separator 13 interposed between the positive electrode 14 and negative electrode 12, an electrolyte (not shown) impregnating the separator 13, a battery case 15, and a sealing member 16 sealing the battery case 15.

The following examples illustrate the present invention in more detail. These examples, however, should not in any sense be interpreted as limiting the scope of the present invention.

Preparation Example 1: Preparation of a Negative Active Material

Flake-type artificial graphite fine particles with an average particle diameter of 3 µm was rotary-milled to prepare an artificial graphite core with an average particle diameter of 20 µm. The fine particles were agglomerated together during the milling and, closed- or open-pores inside the prepared artificial graphite core were formed. Herein, the artificial graphite core had an inside porosity of 40% during the agglomeration.

Next, silicon was ground to prepare silicon nano particles by using a bead mill. Herein, the silicon nano particles had an average particle diameter of 120 nm.

The silicon nano particles were added to isopropyl alcohol, preparing a silicon nano particle liquid. Herein, the silicon nano particles were included much enough not to have phase separation of the silicon nano particles from the isopropyl alcohol but to obtain a slurry. Then, the artificial graphite core was dipped in the silicon nano particle liquid. Herein, the silicon nano particle liquid was inserted into the open-pores inside the artificial graphite core due to capillary action.

Next, the obtained product was mixed with petroleum pitch. The mixture was heat-treated at 900° C. for 3 hours, preparing a negative material of a composite of Si and C The petroleum pitch was carbonized and transformed into hard carbon by the heat treatment and thus, inserted into the closed- and open-pores inside the artificial graphite core and also, formed a shell on the surface of the core, preparing a negative active material. Herein, the silicon nano particle was used, the artificial graphite core, and the petroleum pitch were respectively used in an appropriate amount during the manufacturing process, so that a final negative active material might include 5 wt % of the silicon nano particle, 85 wt % of the artificial graphite core, and 10 wt % of hard carbon.

The negative active material had an average particle diameter of about 15 µm. In addition, the negative active material included silicon nano particles in an amount of 5 wt %, hard carbon in an amount of 10 wt %, and artificial graphite in an amount of 85 wt %. Furthermore, the negative active material had porosity of 40 volume % based on the total volume % thereof.

Examples 1 to 4

The negative material of the composite of Si and C according to Preparation Example 1 was mixed with a copolymer of polyacrylonitrile and methylvinyltriethyleneglycol with a weight average molecular weight of 100,000, as a binder at a ratio provided in the following Table 1 in an N-methylpyrrolidone solvent, preparing a negative active material slurry.

The negative active material slurry was coated on a Cu foil current collector and then, heat-treated at 160° C. in a vacuum-dry chamber (vacuum degree: 10 mbar) for 2 hours, fabricating a negative electrode.

Examples 5 to 8

Negative active material slurry was prepared by mixing a $SiO_x$ (x=0.5) negative active material and a copolymer of polyacrylonitrile and methylvinyltriethylene glycol (a weight average molecular weight: 100,000) as a binder, at a ratio provided in the following Table 1 in an N-methylpyrrolidone solvent.

The negative active material slurry was coated on a Cu foil current collector and heat-treated at 160° C. in a vacuum-dry chamber (vacuum degree: 10 mbar) for 2 hours, fabricating a negative electrode.

Comparative Examples 1 and 2

The negative material of the composite of Si and C according to Preparation Example 1 was mixed with a styrene butadiene rubber binder at a ratio provided in the following Table 1 in an N-methylpyrrolidone solvent, preparing a negative active material slurry.

The negative active material slurry was coated on a Cu foil current collector and then, heat-treated at 160° C. in a vacuum-dry chamber (vacuum degree: 10 mbar) for 2 hours, fabricating a negative electrode.

Comparative Examples 3 and 4

The negative material of the composite of Si and C according to Preparation Example 1 was mixed with a polyvinylidene fluoride binder at a ratio provided in the following Table 1 in an N-methylpyrrolidone solvent, preparing a negative active material slurry.

The negative active material slurry was coated on a Cu foil current collector and heat-treated at 160° C. in a vacuum-dry chamber (vacuum degree: 10 mbar) for 2 hours, fabricating a negative electrode.

Comparative Examples 5 and 6

The negative material of the composite of Si and C according to Preparation Example 1 was mixed with a polyamideimide binder at a ratio provided in the following Table 1 in an N-methylpyrrolidone solvent, preparing a negative active material slurry.

The negative active material slurry was coated on a Cu foil current collector and then, heat-treated at 160° C. in a vacuum-dry chamber (vacuum degree: 10 mbar) for 2 hours, fabricating a negative electrode.

Comparative Examples 7 and 8

The negative material of the composite of Si and C according to Preparation Example 1 was mixed with a mixture of polyvinylalcohol and polyacrylamide (1:1 weight ratio) as a binder at a ratio provided in the following Table 1 in an N-methylpyrrolidone solvent, preparing a negative active material slurry.

The negative active material slurry was coated on a Cu foil current collector and heat-treated at 160° C. in a vacuum-dry chamber (vacuum degree: 10 mbar for 2 hours, fabricating a negative electrode.

Comparative Examples 9 and 10

A $SiO_x$ (x=0.5) negative active material was mixed with a styrene butadiene rubber binder at a ratio provided in the following Table 1 in an N-methylpyrrolidone solvent, preparing a negative active material slurry.

The negative active material slurry was coated on a Cu foil current collector and then, heat-treated at 160° C. in a vacuum-dry chamber (vacuum degree: 10 mbar) for 2 hours, fabricating a negative electrode.

Comparative Examples 11 and 12

A SiO$_x$ (x=0.5) negative active material was mixed with a polyvinylidene fluoride binder at a ratio provided in the following Table 1 in an N-methylpyrrolidone solvent, preparing a negative active material slurry.

The negative active material slurry was coated on a Cu foil current collector and heat-treated at 160° C. in a vacuum-dry chamber (vacuum degree: 10 mbar) for 2 hours, fabricating a negative electrode.

Comparative Examples 13 and 14

A SiO$_x$ (x=0.5) negative active material was mixed with a polyamideimide binder at a ratio provided in the following Table 1 in an N-methylpyrrolidone solvent, preparing a negative active material slurry.

The negative active material slurry was coated on a Cu foil current collector and heat-treated at 160° C. in a vacuum-dry chamber (vacuum degree: 10 mbar) for 2 hours, fabricating a negative electrode.

Comparative Examples 15 and 16

A SiO$_x$ (x=0.5) negative active material was mixed a binder at a ratio provided in the following Table 1 in an N-methylpyrrolidone solvent, preparing a negative active material slurry. Herein, the binder was prepared by mixing polyvinylalcohol and polyacrylamide at a weight ratio of 1:1.

The negative active material slurry was coated on a Cu foil current collector and heat-treated at 160° C. in a vacuum-dry chamber (vacuum degree: 10 mbar) for 2 hours, fabricating a negative electrode.

DSC Experiment of a Binder

Figure 3:
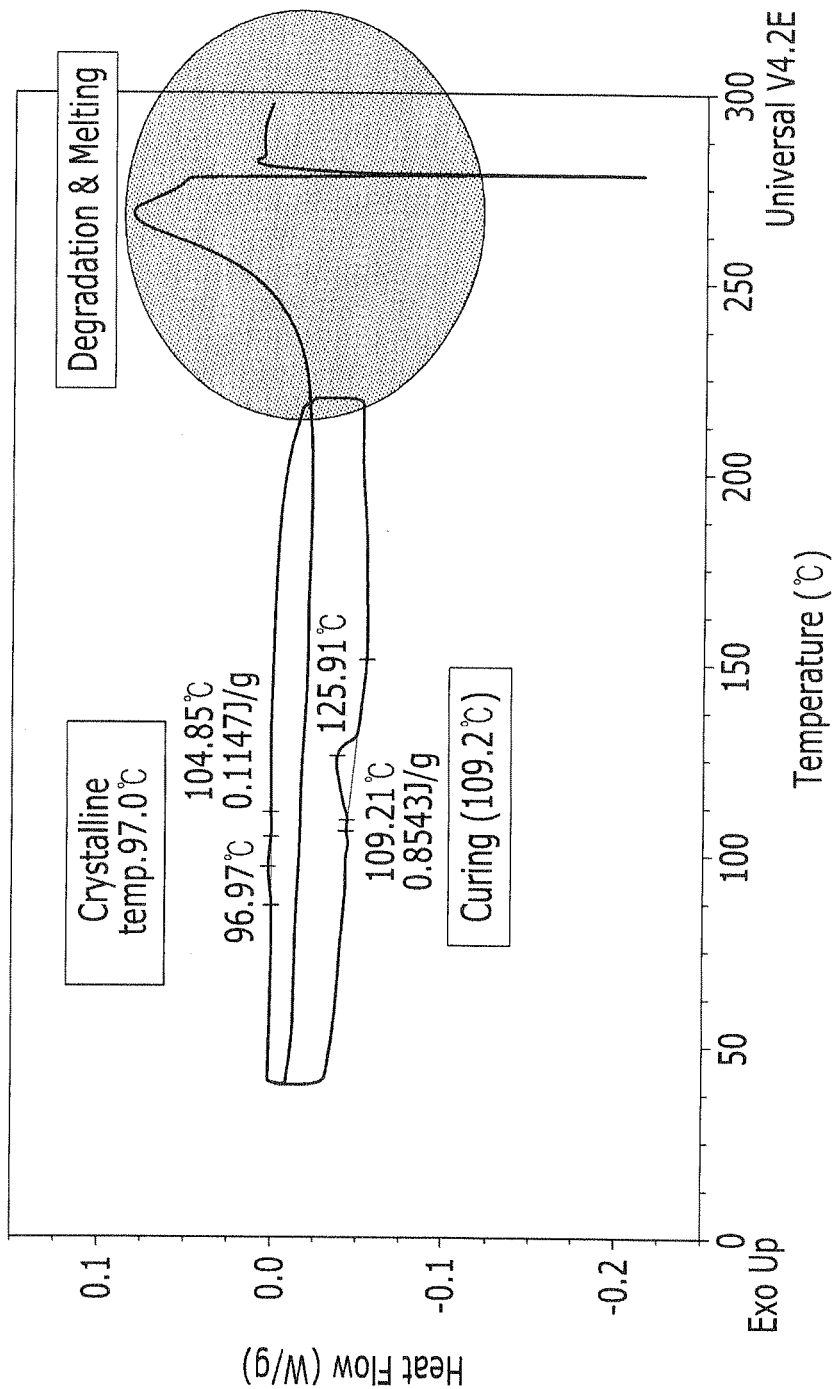
FIG. 3 provides a graph showing a result of the differential scanning calorimetry (DSC) measurement of a binder according to Example 1.

The copolymer binder used in Example 1 was measured regarding heat flow while placed in a DSC pan and heated up to about 300° C. The result is provided in FIG. 3. As shown in FIG. 3, an exothermic reaction occurred at about 109° C. and it was indicated that herein, a cross-linking reaction; that is to say, curing occurred. In addition, when the copolymer binder was heated up to 220° C. and then, cooled down to room temperature and heated up again, it had no exothermic and endothermic reactions. Accordingly, the copolymer binder had a complete cross-linking at an initial cross-linking temperature and became stable.

Figure 4:
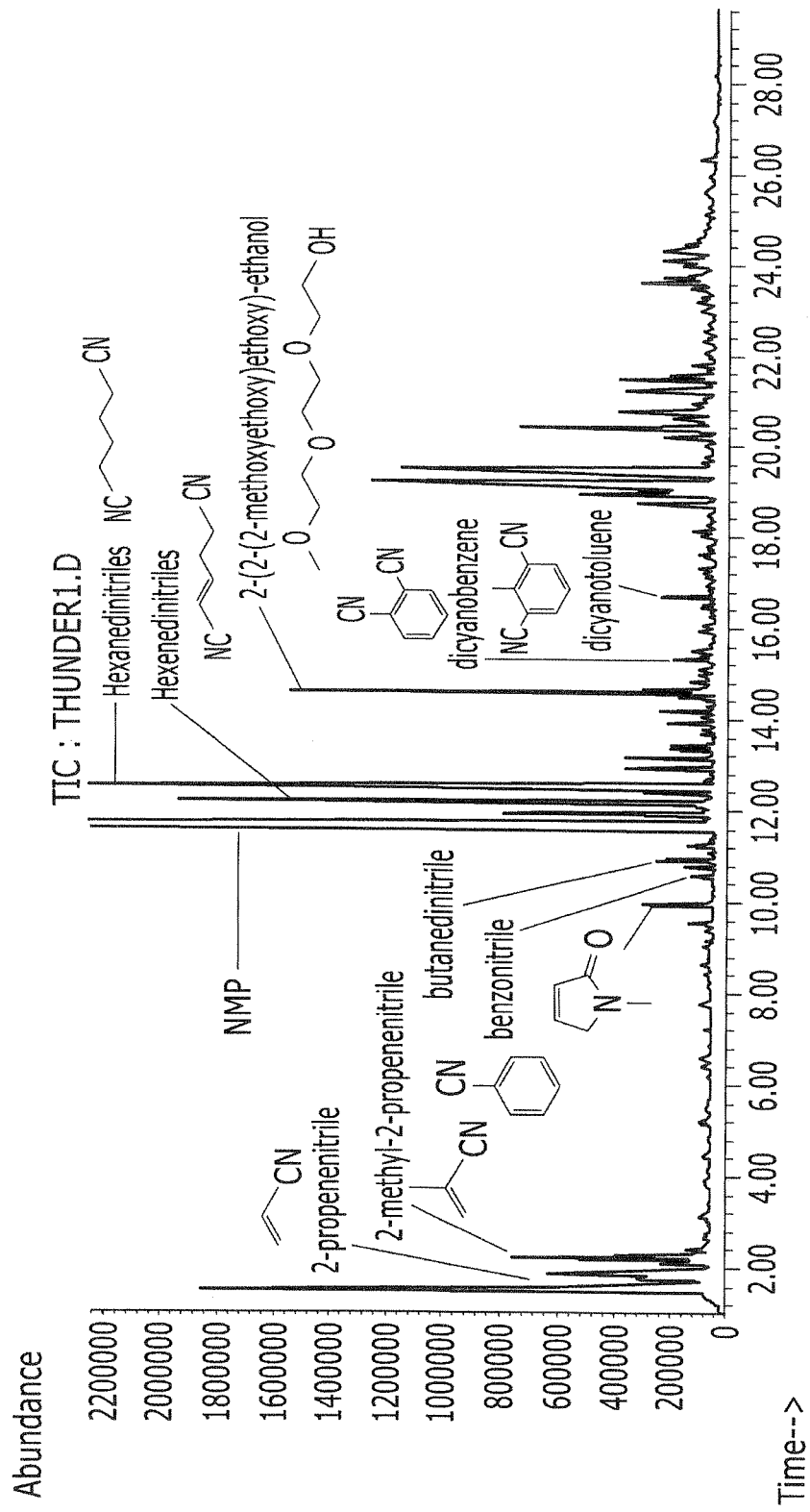
FIG. 4 provides a graph showing a result of pyrolysis-gas chromatography/mass spectroscopy measurement of the binder according to Example 1.

PY-GC/MS (Pyrolysis-Gas Chromatography/Mass Spectroscopy) Experiment of a Binder The copolymer binder used in Example 1 was measured regarding PY-GC/MS (JHS-100A, 6890 Plus/5973N MSD, Jai Korea Co. Ltd.). The result is provided in FIG. 4. As shown in FIG. 4, the copolymer binder included polyacrylonitrile and it was shown from the result that it included methylvinyltriethylene glycol.

Battery Cell Performance

Each negative electrode according to Examples 1 to 8 and Comparative Examples 1 to 16, lithium metal counter electrodes and electrolytes were used to fabricate coin-type half-cells. Herein, the electrolytes were prepared by dissolving 1.0M LiPF$_6$ in a solvent prepared by mixing ethylene carbonate and diethyl carbonate at a volume ratio of 3:7.

The half-cells were charged at 0.2 C to a cut-off voltage of 0.01V (constant-current charging), charged at 0.01V to a cut-off of 0.01 C (constant-voltage charging), and then discharged at 0.2 C to a cut-off voltage 1.5V. The resulting half-cells were measured regarding charge and discharge capacity. The charge and discharge capacity were used to calculate initial charge and discharge efficiency ((discharge capacity/charge capacity)×100). The results are provided in the following Table 1.

In addition, when the half-cells were charged and discharged 100 times at 0.5 C, thicknesses at each charge and discharge measured. The thicknesses were used to calculate the expansion ratio of an electrode ((thickness during the charge/thickness during the discharge)×100). The results are provided in the following Table 1.

Furthermore, the half-cell was charged at 0.5 C to a cut-off voltage of 0.01V, charged at 0.01V to a cut-off of 0.01 C and discharged at 0.5 C to a cut-off voltage of 1.5V. The charging and the discharging were performed for 100 times. The resulting cell measured a regarding cycle life ((discharge capacity at 100th cycle/discharge capacity at a first cycle)×100). The results are provided in the following Table 1.

TABLE 1

| | Active material (wt %) | Binder (wt %) | Initial charge and discharge efficiency (%) | Expansion ratio of electrode (%) | Cycle life (%) |
|---|---|---|---|---|---|
| Example 1 | 99 | 1 | 97 | 31 | 94 |
| Example 2 | 97 | 3 | 96 | 26 | 93 |
| Example 3 | 95 | 5 | 95 | 22 | 96 |
| Example 4 | 90 | 10 | 93 | 20 | 97 |
| Example 5 | 99 | 1 | 88 | 25 | 92 |
| Example 6 | 97 | 3 | 87 | 20 | 93 |
| Example 7 | 95 | 5 | 86 | 19 | 95 |
| Example 8 | 90 | 10 | 85 | 17 | 96 |
| Comparative Example 1 | 97 | 3 | 81 | 55 | 75 |
| Comparative Example 2 | 90 | 10 | 80 | 43 | 66 |
| Comparative Example 3 | 97 | 3 | 82 | 63 | 74 |
| Comparative Example 4 | 90 | 10 | 79 | 52 | 46 |
| Comparative Example 5 | 97 | 3 | 81 | 36 | 76 |
| Comparative Example 6 | 90 | 10 | 82 | 37 | 77 |
| Comparative Example 7 | 97 | 3 | 83 | 38 | 80 |
| Comparative Example 8 | 90 | 10 | 79 | 39 | 82 |
| Comparative Example 9 | 97 | 3 | 79 | 57 | 72 |
| Comparative Example 10 | 90 | 10 | 80 | 43 | 65 |
| Comparative Example 11 | 97 | 3 | 82 | 64 | 75 |
| Comparative Example 12 | 90 | 10 | 78 | 52 | 46 |
| Comparative Example 13 | 97 | 3 | 75 | 36 | 72 |
| Comparative Example 14 | 90 | 10 | 76 | 37 | 76 |
| Comparative Example 15 | 97 | 3 | 78 | 38 | 75 |
| Comparative Example 16 | 90 | 10 | 77 | 36 | 74 |

As shown in Table 1, when a negative material of a composite of Si and C or a SiO$_x$ negative active material was used with a styrene butadiene rubber binder, a polyvinylidene fluoride binder, a polyamideimide binder, or a mixed binder of polyvinylalcohol and polyacrylamide, the half-cells had too large expansion ratio of an electrode during the charge and discharge. Accordingly, the binder was broken and lost adherence and thus, was detached from a current collector, remarkably deteriorating cycle life of the half-cells. In particular, since a polyvinylidene fluoride binder had no flexibility and was a hard crystalline binder, too large expansion ratio of an electrode is caused when used with a Si-based negative active material with a wide expansion and contraction range, deteriorating cycle life.

Whereas, the half-cells including a copolymer binder of polyacrylonitrile and methylvinyltriethyleneglycol according to Examples 1 to 8 were suppressed from electrode expansion due to a cross-linking reaction and excellent adherence of the binder and thus, had excellent cycle life.

Figure 5:
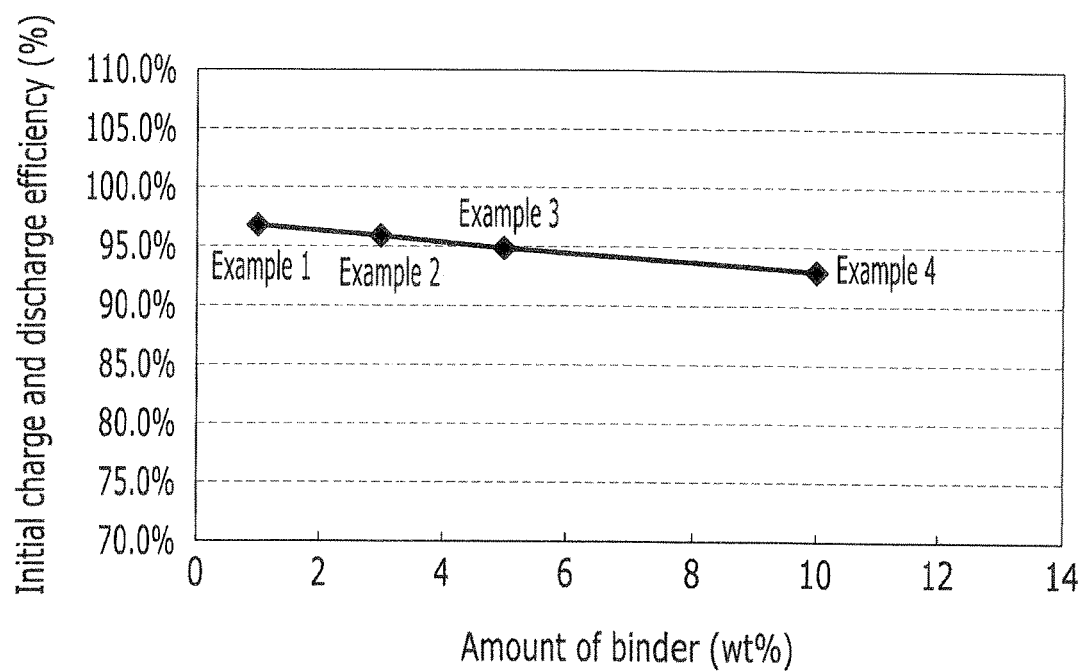
FIG. 5 shows a graph showing initial charge and discharge efficiency of a half-cell respectively including negative electrodes according to Examples 1 to 4.

In addition, FIG. 5 provides the initial charge and discharge efficiency results of the half-cells according to Examples 1, 2, 3, and 4. As shown in FIG. 5, when the amount of the copolymer binder was increased, the half-cells were turned out to have much deteriorated initial charge and discharge efficiency.

Examples 9 to 12

95 wt % of the negative material of the composite of Si and C according to Preparation Example 1 was mixed with 5 wt % of a copolymer binder (weight average molecular weight: 100,000) of polyacrylonitrile and methylvinyltriethyleneglycol in an N-methyl pyrrolidone solvent, preparing a negative active material slurry.

The negative active material slurry was coated on a Cu foil current collector and heat-treated at a temperature provided in the following Table 2 in a vacuum-dry chamber for 2 hours, fabricating a negative electrode.

Examples 13 to 16

95 wt % of a SiO$_x$ (x=0.5) negative active material and 5 wt % of copolymer binder (a weight average molecular weight: 100,000) of polyacrylonitrile and methylvinyltriethyleneglycol were mixed in an N-methylpyrrolidone solvent, preparing a negative active material slurry.

The negative active material slurry was coated on a Cu foil current collector and heat-treated at a temperature given in the following Table 2 in a vacuum-dry chamber (vacuum degree: 10 mbar) for 2 hour, fabricating a negative electrode.

Comparative Examples 17 and 18

A negative electrode was fabricated according to the same method as Example 9 except for changing a temperature for heat treatment into a temperature in the following Table 2.

Comparative Examples 19 and 20

A negative electrode was fabricated according to the same method as Example 13 except for changing a temperature for heat treatment into a temperature in the following Table 2.

Battery Cell Performance

The negative electrodes according to Examples 9 to 16 and Comparative Examples 17 to 20, lithium metal counter electrodes, and electrolytes were used to fabricate coin-type half-cells. Herein, the electrolytes were prepared by dissolving 1.0M LiPF$_6$ in a mixed solvent prepared by mixing ethylene carbonate and diethyl carbonate at a volume ratio of 3:7.

The half-cells were charged at 0.2 C to a cut-off voltage of 0.0V (constant-current charging), charged at 0.00V to a cut-off of 0.001 C (constant-voltage charging), and then discharged at 0.2 C to a cut-off voltage 1.5V. The resulting half-cells were used to calculate initial charge and discharge efficiency ((discharge capacity/charge capacity)×100). The results are provided in the following Table 2.

In addition, the half-cells were charged at 0.5 C to a cut-off voltage of 0.0V, charged at 0.00V to a cut-off of 0.001 C and discharged at 0.5 C to a cut-off voltage of 1.5V. The charging and the discharging were performed for 100 times. The resulting cell measured regarding cycle life ((discharge capacity at 100 times/discharge capacity at a first time)×100). The results are provided in the following Table 2.

TABLE 2

| | Vacuum-dry temperature (° C.) | Initial charge and discharge efficiency (%) | Cycle life (%) |
|---|---|---|---|
| Example 9 | 80 | 82 | 91 |
| Example 10 | 120 | 87 | 93 |
| Example 11 | 140 | 85 | 94 |
| Example 12 | 160 | 80 | 90 |
| Example 13 | 80 | 82 | 93 |
| Example 14 | 120 | 82 | 92 |
| Example 15 | 140 | 83 | 94 |
| Example 16 | 160 | 81 | 93 |
| Comparative Example 17 | 70 | 73 | 72 |
| Comparative Example 18 | 170 | 72 | 75 |
| Comparative Example 19 | 70 | 74 | 73 |
| Comparative Example 20 | 170 | 75 | 76 |

As shown in Table 2, the half-cells vacuum-dried at a temperature ranging from 80 to 160° C. according to Examples 9 to 16 had excellent initial charge and discharge efficiency and cycle life, while the half-cells vacuum-dried at a low temperature of 70° C. or a high temperature of 170° C. according to Comparative Examples 17 to 20 had deteriorated initial charge and discharge efficiency and cycle life.

Example 17

93.5 wt % of the negative material of the composite of Si and C according to Preparation Example 1 and 7.5 wt % of a copolymer binder (weight average molecular weight: 100,000) of polyacrylonitrile and methylvinyltriethyleneglycol were mixed in an N-methyl pyrrolidone solvent, preparing a negative active material slurry.

Then, a negative electrode was fabricated according to the same method as in Example 10 except for using the negative active material slurry.

TGA (Thermogravimetric Analyzer) Analysis

Figure 6:
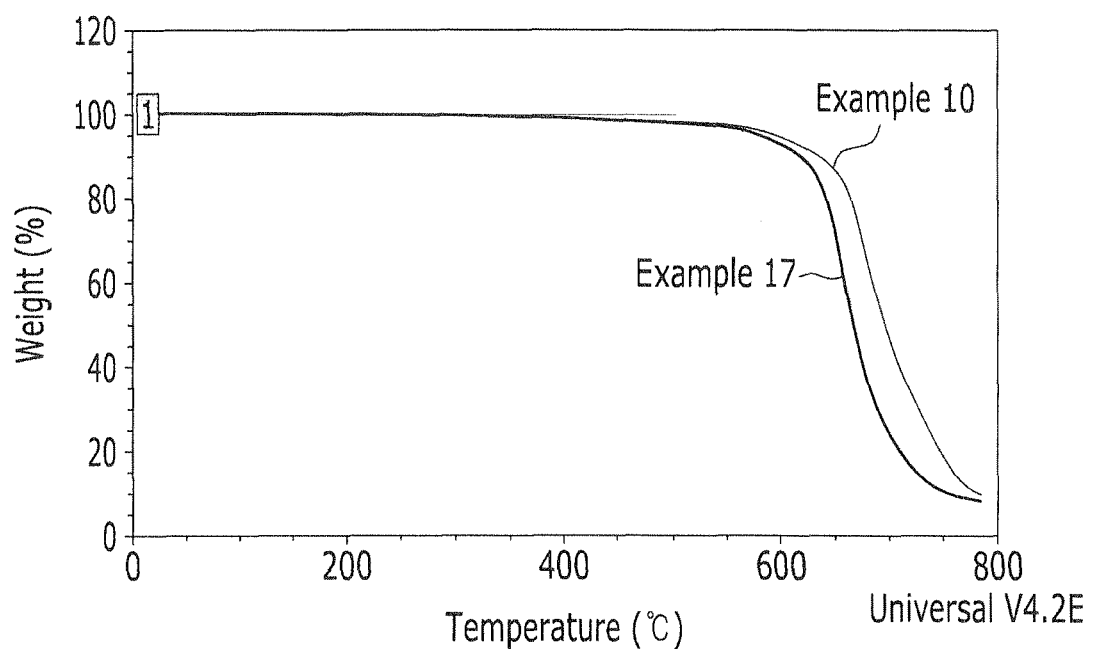
FIG. 6 is a graph showing thermogravimetric analysis (TGA) measurement of negative electrodes according to Examples 10 and 17.

A negative active material layer was separated from each negative electrode according to Examples 10 and 17 and then, measured regarding TGA under an air atmosphere. The results are provided in FIG. 6. As shown in FIG. 6, the negative active material layer had a little weight loss at a temperature ranging from about 200° C. to about 600° C. but remarkably weight loss at a temperature of about 600° C. or higher. The weight loss at a temperature ranging from about 200° C. to about 600° C. occurred due to pyrolysis of the binder. The weight loss at a temperature ranging from 600° C. or higher occurred due to pyrolysis of an active material.

Figure 7:
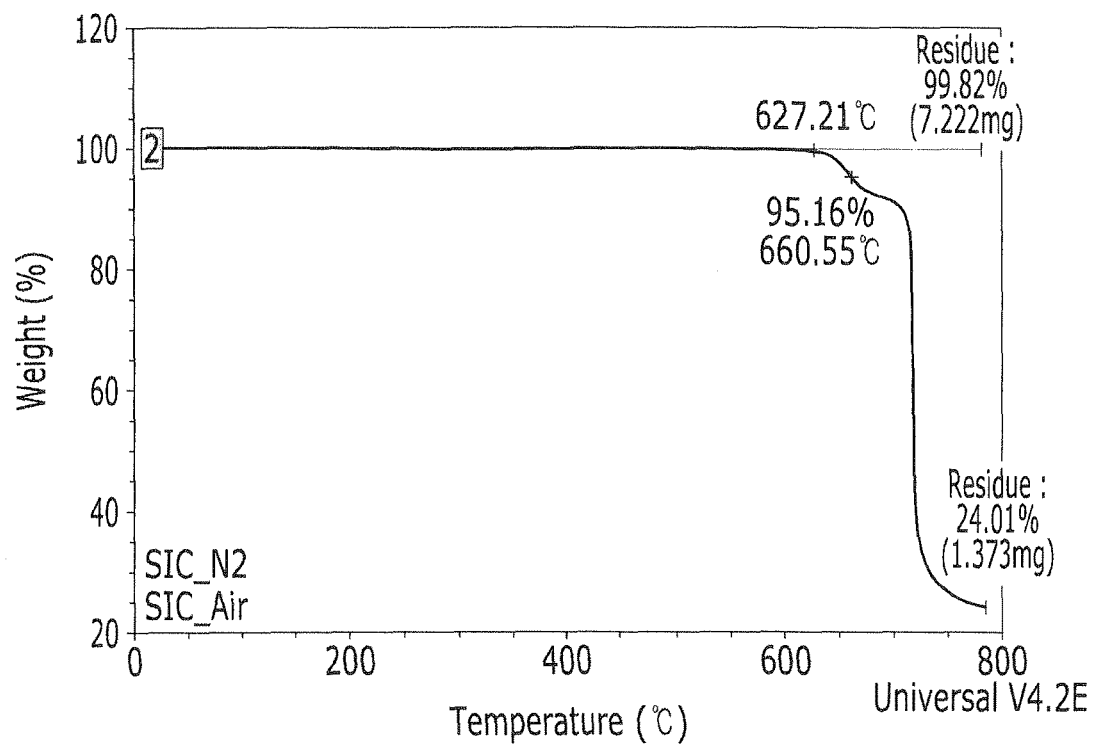
FIG. 7 is a graph showing thermogravimetric analysis (TGA) measurement of a negative active material according to Preparation Example 1.

In particular, FIG. 7 clearly shows the results through TGA of the negative active materials used in Examples 10 and 17, the negative material of the composite of Si and C used in Preparation Example 1, respectively measured under an air atmosphere and an $N_2$ atmosphere.

As shown in FIG. 7, when TGA was measured under $N_2$ atmosphere, there was no weight loss and thus, no pyrolysis. When TGA was measured under air atmosphere, there was a weight loss at a temperature of about 600° C. or higher due to pyrolysis of a material. The weight loss was found to come from pyrolysis of an active material. Accordingly, the weight loss at a temperature ranging from about 200° C. to about 600° C. in the results of FIG. 6 was identified to be caused by pyrolysis of a binder.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode for a rechargeable lithium battery, comprising:
    a negative active material layer comprising a polymer binder wherein the binder is a copolymer of the repeating units represented by the following Chemical Formula 1 and methylvinyl triethylene glycol; and a composite of Si and C negative active material; and
    a current collector supporting the negative active material layer,
    wherein the binder is included in an amount of 1 wt % to 10 wt % based on the total weight of the negative active material layer, and
    the polymer binder has a weight average molecular weight of 100,000 to 1,000,000:

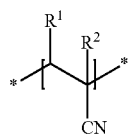

[Chemical Formula 1]

wherein, $R^1$ and $R^2$ are the same or are different, and are hydrogen, OH or OOH.

2. The negative electrode of claim 1, wherein the composite of Si and C negative active material comprises $SiO_x$ (0<x<2), Si, an alloy of Si and Q (wherein, Q is an element selected from the group consisting of an alkali metal, an alkali-earth metal, a Group 13 element, a Group 14 element, a Group 15 element, a Group 16 element, a transition element, a rare earth element, and a combination thereof, and not Si), or a combination thereof.

3. The negative electrode of claim 1, wherein the composite of Si and C comprises:
    a crystalline carbon core including pores therein;
    an amorphous carbon shell formed on the surface of the core;
    Si nano particles dispersed in the pores; and
    amorphous carbon present inside the pores.

4. The negative electrode of claim 1, wherein the polymer binder is a copolymer of polyacrylonitrile and methylvinyl triethylene glycol.

5. The negative electrode of claim 1, wherein the negative active material layer further comprises a carbon-based negative active material.

6. A rechargeable lithium battery, comprising:
    a negative electrode comprising:
        a negative active material layer comprising a polymer binder wherein the binder is a copolymer of the repeating units represented by the following Chemical Formula 1 and methylvinyl triethylene glycol; and a composite of Si and C negative active material; and
        a current collector supporting the negative active material layer,
        wherein the binder is included in an amount of 1 wt % to 10 wt % based on the total weight of the negative active material layer, and
        the polymer binder has a weight average molecular weight of 100,000 to 1,000,000:

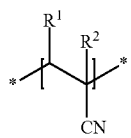

[Chemical Formula 1]

wherein, $R^1$ and $R^2$ are the same or are different, and are hydrogen, OH or OOH;
    a positive electrode including a positive active material; and
    an electrolyte.

7. A method of negative electrode for a rechargeable lithium battery, comprising:
    mixing a polymer binder wherein the binder is a copolymer of the repeating units represented by the following Chemical Formula 1 and methylvinyl triethylene glycol; or includes a repeating unit of the following Chemical Formula 2 and a composite of Si and C negative active material in a solvent to prepare a negative active material composition;
    applying the negative active material composition on a current collector; and
    heat-treating the current collector applied with the negative active material composition at 80° C. to 160° C.:

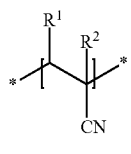

[Chemical Formula 1]

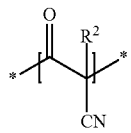

[Chemical Formula 2]

wherein, $R^1$ and $R^2$ are the same or are different, and are hydrogen, OH or OOH.

8. The method of claim 7, wherein the heat-treating is performed at 100° C. to 140° C.

9. The method of claim 7, wherein the heat-treating is performed under a vacuum atmosphere.

10. The method of claim 7, wherein the composite of Si and C negative active material comprises $SiO_x$ (0<x<2), Si, an alloy of Si and Q (wherein, Q is an element selected from the group consisting of an alkali metal, an alkali-earth metal, a Group 13 element, a Group 14 element, a Group 15 element, a Group 16 element, a transition element, a rare earth element, and a combination thereof, and not Si), or a combination thereof.

11. The method of claim 9, wherein the composite of Si and C comprises
   a crystalline carbon core including pores therein;
   an amorphous carbon shell formed on the surface of the core;
   Si nano particles dispersed in the pore; and
   amorphous carbon present inside the pore.

12. The method of claim 7, wherein during preparing the negative active material composition, a carbon-based negative active material is further added.

* * * * *